United States Patent
Garcia Villegas et al.

(10) Patent No.: US 10,367,602 B2
(45) Date of Patent: Jul. 30, 2019

(54) DATA MODULATION METHOD FOR IEEE 802.11 DEVICES TO GENERATE LOW FREQUENCY SIGNALS

(71) Applicant: UNIVERSITAT POLITECNICA DE CATALUNYA, Barcelona (ES)

(72) Inventors: Eduardo Garcia Villegas, Barcelona (ES); Elena Lopez Aguilera, Barcelona (ES); Joaquim Oller Bosch, Barcelona (ES); Ilker Seyfettin Demirkol, Barcelona (ES); Jordi Casademont Serra, Barcelona (ES); Josep Paradells Aspas, Barcelona (ES)

( * ) Notice: Subject to any disclaimer, the term of this patent is extended or adjusted under 35 U.S.C. 154(b) by 0 days.

(21) Appl. No.: 14/799,048

(22) Filed: Jul. 14, 2015

(65) Prior Publication Data
US 2017/0019208 A1    Jan. 19, 2017

(51) Int. Cl.
*H04L 1/00* (2006.01)
*H04L 27/02* (2006.01)

(52) U.S. Cl.
CPC ............ *H04L 1/0009* (2013.01); *H04L 27/02* (2013.01)

(58) Field of Classification Search
CPC ............................ H04L 1/0009; H04L 5/0055
See application file for complete search history.

(56) References Cited

U.S. PATENT DOCUMENTS

| | | | |
|---|---|---|---|
| 8,259,691 B2 | 9/2012 | Zimmerman et al. | |
| 9,485,716 B2 * | 11/2016 | Seok | H04W 48/14 |
| 2006/0063484 A1 | 3/2006 | Proctor, Jr. et al. | |
| 2010/0040120 A1 * | 2/2010 | Sharma | H04W 52/0229 375/219 |
| 2012/0120859 A1 | 5/2012 | Stephens et al. | |
| 2014/0112225 A1 * | 4/2014 | Jafarian | H04W 52/0235 370/311 |
| 2014/0126442 A1 * | 5/2014 | Jafarian | H04W 52/0212 370/311 |
| 2015/0023447 A1 * | 1/2015 | Kondo | H04L 25/49 375/295 |

(Continued)

OTHER PUBLICATIONS

Valadas et al. The Infrared Physical Layer of the IEEE 802.11 Standard for Wireless Local Area Networks. IEEE communications Magazine Dec. 1998.*

(Continued)

*Primary Examiner* — Jeffrey M Rutkowski
*Assistant Examiner* — Basil Ma
(74) *Attorney, Agent, or Firm* — Eugenio J. Torres-Oyola; Victor M. Rodriguez-Reyes; Rafael Rodriguez-Muriel

(57) ABSTRACT

A data modulation method with low frequency signals, encapsulating a plurality of data along with an identifier corresponding to one or multiple LR receivers, and a given preamble into their associated fields to form a LR frame by means of a formatter. The preamble of the LR frame prepares the LR receiver for the reception of the receiver ID and data. An encoding stage whereby a line code generates a plurality of coded data from an LR frame. The transmission of the coded data using ASK modulation through an encoder, rules the transmission of a frame burst emulating the transmission of a modulated low frequency carrier signal. The frame burst is composed of frames compliant with any standard defined by the IEEE 802.11 Working Group or IEEE 802.15 Working Group.

12 Claims, 2 Drawing Sheets

(56) References Cited

U.S. PATENT DOCUMENTS

2018/0063788 A1* 3/2018 Yang .................... H04W 12/10

OTHER PUBLICATIONS

Latre et al. Throughput and Delay Analysis of Unslotted IEEE 802.15.4 Journal of Networks May 2006.*
Magno, Michele et al. : "An Ultra Low Power High Sensitivity Wake-Up Radio Receiver with Addressing Capability" 2014 International Workshop on Green Optimized Wireless Networks. (Year: 2014).*
Bdiri et al. "An ultra-low power wake-up receiver for real-time constrained wireless sensor networks" in Proc. AMA Conf. Nuremberg, Germany May 2015 pp. 612-617 (Year: 2015).*
J. Oller, et al; IEEE 802.11—enabled wake-up radio system: design and performance evaluation; Electronics Letters; vol. 50; No. 20; Sep. 2014; pp. 1484-1486.

* cited by examiner

DATA MODULATION METHOD FOR IEEE 802.11 DEVICES TO GENERATE LOW FREQUENCY SIGNALS

FIELD OF THE INVENTION

The present invention can be classified within the field of wireless communications. More precisely, this invention closely relates to IEEE 802.11-based wireless local area network (WLAN) technologies, and IEEE 802.15-based wireless personal area network (WPAN) technologies.

BACKGROUND OF THE INVENTION

In the document Mishra, N.; Chebrolu, K.; Raman, B.; Pathak, A., "Wake-on-WLAN", in Proceedings of WWW Conference 2006, authors propose using "sleeping" WLAN stations featuring a low-power sensor to monitor the stations' working channel. Upon energy detection in such channel, the sensor is in charge of waking up the main WLAN transceiver. Although this approach has the advantage of not requiring a custom transmitter, the number of false positives detected by the sensor is too high, even when the system operates in a lightly loaded ISM (Industrial, Science & Medical) channel.

The same authors tried to overcome this issue by incorporating address patterns in the incoming activation signals, as explained in the document Mishra, N.; Golcha, D.; Bhadauria, A.; Raman, B.; Chebrolu, K., "S-WOW: signature based Wake-on-WLAN", in Proceedings of COMSWARE 2007. In this second proposal, they use alternate long standard Wi-Fi frames and silence periods to code address patterns in a Non-Return-to-Zero (NRZ) manner. Unfortunately, for communications with purposes other than Wake-up, the data-rate of this strategy is too low (the wake-up signal can last up to 1 second). In addition, due to the long silence periods (~20 ms), this system is still prone to interferences.

Similar to the previous approach, the authors Kondo, Y.; Yomo, H.; Tang, S.; Iwai, M.; Tanaka, T.; Tsutsui, H.; Obana, S., in their article "Energy-efficient WLAN with on-demand AP Wake-up using IEEE 802.11 frame length modulation," Computer Communications, Vol. 35, No. 14, p. 1725-1735, August 2012, code unique addresses by varying the IEEE 802.11 frame lengths. However, although more resilient to interferences, this approach is still slow, and thus inappropriate for long data transmissions. Furthermore, the current consumption of its associated Wake-up Receiver design is in the milliAmper (mA) order. This is simply unacceptable for Wake-up Radio systems, where receivers should not employ more than 10 μW.

A strategy consisting in varying the size of IEEE 802.11 frames (or another wireless technology) is also proposed in the U.S. Pat. No. 8,259,691B2, where the authors use such procedure to remotely configure a low-power device which provides no other human interaction interface (i.e. no keyboard, touchscreen, etc.). Data is decoded by comparing the relative length difference between two consecutive frames in such a way that a change in the frame length represents a binary '0'. Analogously, no change in the frame length represents a '1'. Again, surrounding transmissions, even from a different standards such as IEEE 802.15.4, may invalidate an ongoing Wake-up procedure.

In application US20120120859 A1, the utilization of unused OFDM subcarriers at the edges of the IEEE 802.11a/g spectrum is proposed to embed Wake-up signals. According to this standard, there are 52 OFDM subcarriers, but the authors propose to use up to 4 additional subcarriers. This approach requires severe hardware and software modifications in standard-compliant devices. Furthermore, it is limited to IEEE 802.11 transmissions based on OFDM, which allow for shorter communication range than the ones based on DSSS (Direct Sequence Spread Spectrum).

In the application US20060063484 A1, an Amplitude Modulated (AM) signal is employed to transmit data at low bit-rates. This signal is generated by using IEEE 802.11 frames where a standard preamble is followed by a non-standard amplitude-modulated waveform, generated by a gain control mechanism installed in the transmitter. Note that this approach also requires modifying the hardware of the IEEE 802.11 devices.

To summarize, the vast majority of works in the related literature are focused on the implementation of Wake-up signals, following different strategies. However, such implementations do not consider or implement a low frequency, low-rate signal using standard-compliant IEEE 802.11/802.15 frames. In fact, even if some of the previous solutions could be used for similar purposes, they would be either inefficient or require intensive hardware modifications. These two issues strongly limit their potential reproducibility and applicability. In comparison, the invention proposed in the current document does not require any hardware modification on IEEE 802.11 or IEEE 802.15 commercial devices; it can be used to generate a Wake-up message (or any other low-rate data) by emulating a low frequency signal by means of only standard IEEE 802.11 or IEEE 802.15 frames.

SUMMARY OF THE INVENTION

In this document, we present a new method to generate a low frequency carrier signal from any off-the-shelf IEEE 802.11 or IEEE 802.15 capable device. Such low frequency carrier can then be modulated to carry any digital data intended for feature-limited wireless receivers such as sensors/actuators for a very low-power operation.

The method to embed low rate data transmissions within legacy IEEE 802.11 or IEEE 802.15 transmissions presented in this document, includes the encapsulation of a plurality of binary data along with the identifier of the intended receiver or receivers, and a given preamble in different fields of a low rate (LR) frame, where the preamble is used to prepare the LR receiver. This encapsulation is carried out by a formatter stage. The proposed method also includes the codification of the LR frame by means of a line code to produce a series of high-rate frame bursts emulating a low frequency, ASK-modulated carrier signal.

Optionally, the transmission of the frame burst follows any standard defined by the IEEE 802.11 Working Group.

Optionally, the transmission of the frame burst follows any standard defined by the IEEE 802.15 Working Group.

Optionally, the frame burst is composed of the successive transmission of the smallest frame defined by aforementioned standards, which are separated by the shortest interframe space time allowed by these standards.

Optionally, the frame burst is composed of successive transmissions of null data packets (NDP).

Optionally, the frame burst is composed of successive transmissions of control frames of type acknowledgment (ACK).

Optionally, the frame burst is composed of successive transmissions of control frames of type request to send (RTS).

Optionally, the frame burst is composed of successive transmissions of control frames of type clear to send (CTS).

Optionally, the frame burst is composed of successive transmissions of management frames of type beacon.

Optionally, the frame burst is composed of successive transmissions of empty broadcast/multicast data frames.

Optionally, the frame burst is composed of successive transmissions of empty broadcast/multicast data frames separated by a reduced inter-frame space (RIFS) time during a transmission opportunity (TXOP).

Optionally, the frame burst is composed of IEEE 802.11-compliant frames which include a Duration/ID field set to a value larger or equal to the remaining duration of the LR frame.

BRIEF DESCRIPTION OF THE FIGURES

The following description of the invention is complemented by means of a series of figures, which aid in better understanding of the invention and which are expressly related to an embodiment of this invention, presented as a non-limiting example thereof.

DETAILED DESCRIPTION OF THE INVENTION

Next generation Wi-Fi communications are designed for the exchange of information at very high speeds (around 7 Gbit/s) in unlicensed frequency bands. The method proposed in this document allows such signals to be used for modulating data at low rates, in order to communicate with low-power and/or feature-limited wireless receivers, which do not necessarily meet the IEEE 802.11 or IEEE 802.15 standards.

Figure 1:
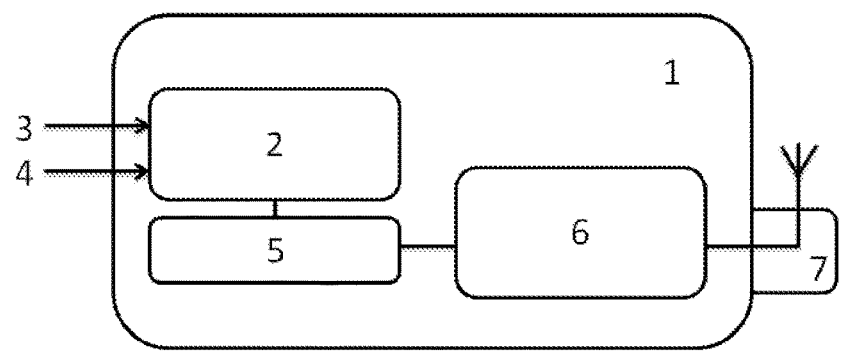
FIG. 1: Block diagram of the LR transmitter and LR receiver.
Figure 1:
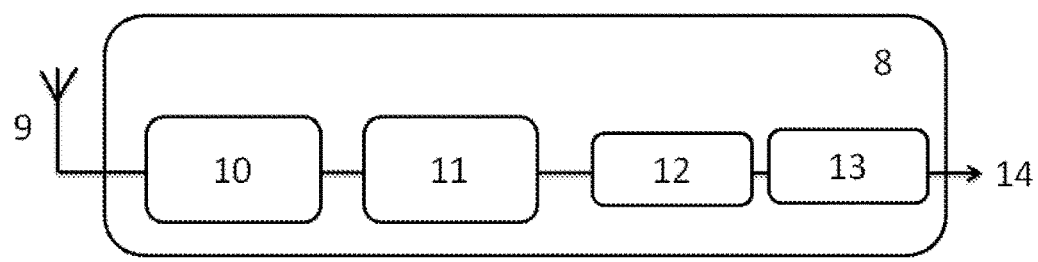

Transmission of low-rate (LR) digital signals is carried out by a portable electronic device (e.g. a smartphone, laptop PC, netbook, tablet, etc.) equipped with a network interface card (NIC) 7 which is either IEEE 802.11 or IEEE 802.15 standard compliant, as shown in FIG. 1. The LR Transmitter 1 has two main components: the data formatter 2, where LR frames are generated, and the encoder 5, which codes and modulates the frame created.

Figure 2:
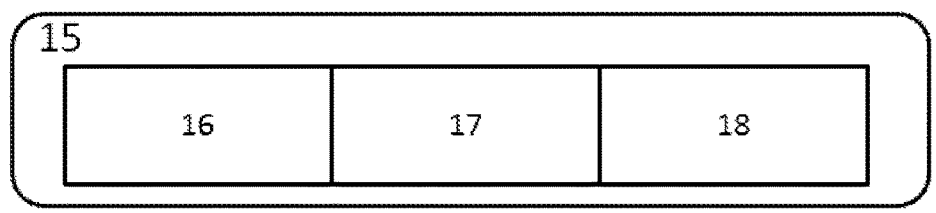
FIG. 2: Encapsulation of binary data in a LR frame.

Triggered by an application installed in the user's electronic device, or following an interaction by the user, the formatter 2 of the LR Transmitter 1 receives the binary data 3 to be transmitted. The formatter 2 is also fed with the identifier (or address) 4 of the intended LR Receiver 8. The identifier 4 consists of a configurable-length binary sequence which is used to identify the intended LR Receiver 8 (or receivers, in case of multicast/broadcast transmission) among all potential receivers. The formatter 2 then encapsulates the identifier 4 and binary data 3 into the Receiver ID 17 and data 18 fields, respectively, of a LR frame 15, as shown in FIG. 2. The LR frame 15 includes a preamble 16. The preamble 16 consists of a predefined series of bits, used to train the comparator module 12 of the LR Receiver 8.

Figure 3:
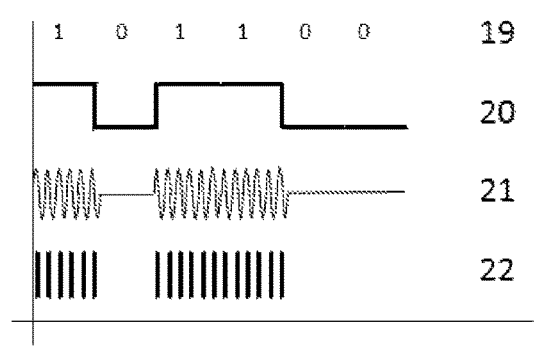
FIG. 3: Transmission of a frame burst containing coded data.

In the next step, the bit sequence of the LR frame 15 is coded, using a line code, by the LR transmitter's encoder module 5. FIG. 3 shows the effects of the different transmission stages. In the first stage, the formatter 2 creates the LR frame 15 from the input data 3 and the receiver's ID 4.

The formatter 2 produces the LR binary data 19 at its output. The second stage, carried out by the encoder 5, produces the coded data 20, as shown in FIG. 3 for the case where NRZ coding is used. With NRZ, the binary '1' is represented as a high value of duration $T_b$, and the binary '0' as a low value during the same duration $T_b$. Note that the encoder 5 can use other line codes, such as a Manchester code, where each bit period $T_b$ is divided into two equal-length intervals; the binary '1' is then transmitted as a high value during the first half of $T_b$ followed by a low value during the second half; for a binary '0', those intervals are reversed.

The coded data 20 are used by a third stage, handled by the same encoder 5. In this third stage, the coded data 20 is used to modulate a low frequency carrier through an Amplitude-Shift Keying (ASK)-like modulation. The simplest form of ASK is known as On-off keying (OOK) 21. OOK represents digital data as the presence or absence of a carrier wave; that is, the presence of a carrier for a duration of $T_b$ signifies a high value of the line code (binary '1' of a NRZ), while its absence for the same duration represents a low value (binary '0' of a NRZ). In order to emulate the presence of a low frequency carrier signal, the encoder module 5 interfaces the driver 6 of the wireless NIC and requests the transmission of a frame burst 22, as shown in FIG. 3. Those bursts consist in a certain number of IEEE 802.11 or IEEE 802.15 standard-compliant frames sent at a given regular pace. That is, during the On state, the encoder 5 of the LR transmitter 1 generates standard layer two frames. Conversely, during Off periods, the encoder 5 remains silent. The driver 6 then forwards the frame transmission requests coming from the encoder 5 to the physical layer. The physical layer resides in the wireless NIC 7, which is either IEEE 802.11 or IEEE 802.15 standard compliant. The wireless NIC 7 transmits the IEEE 802.11 or IEEE 802.15 frame burst generated by the encoder 5 in the 0.9, 2.4 or 5 GHz ISM band. The encoder module 5 of the LR transmitter 1 may also include an additional carrier burst at the beginning of the transmission of a LR frame 15 in order to prepare the radio frequency circuitry of the LR receiver 8.

In this proposal, the wireless interface 7 of the LR transmitter 1 can be any off-the-shelf IEEE 802.11 or IEEE 802.15 NIC since the present invention does not require any hardware modification. What this invention proposes is a new method whereby binary data coming from the user 3 is transformed and transmitted by a wireless NIC 7, as set out for the formatter 2 and the encoder 5 of the LR transmitter 1. The generation of a regular frame burst 22 through a standard IEEE 802.11 or IEEE 802.15 wireless NIC is not trivial and requires a precise timing as detailed next.

For the successful generation of a low frequency carrier signal, several challenges need to be addressed. The first problem to overcome is the generation of the frame burst 22 through, for example, a wireless NIC which meets the Wi-Fi certification. The generation of the frame burst could be achieved by continuously transmitting the smallest possible IEEE 802.11 frame, spaced by the smallest possible inter frame space allowed by the IEEE 802.11 standard. Given that not all available Wi-Fi NICs in the market allow such transmissions, we provide a set of alternatives, seeking the compatibility of the proposed mechanisms with the widest possible set of commercial Wi-Fi NIC vendors and manufacturers:

Successive transmission of acknowledgment frames (ACK) spaced by a short space inter-frame space frames (SIFS), as specified by the IEEE 802.11 standard.

Successive transmission of management frames of type beacon, with a configurable interval between consecutive beacons (Beacon Interval), a configurable frame size (in bytes) and bit rate.

Successive transmission of null data packet frames of any type, with a configurable interval between consecutive transmissions.

Successive transmission control frames of type RTS or CTS, with a configurable interval between consecutive transmissions.

Regular transmission of empty data frames with broadcast/multicast destination address (which requires no ACK response from the receiver) with backoff mechanism disabled and the space between consecutive frames set to DCF Inter-Frame Space (DIFS), as defined by the IEEE 802.11 standard.

Disable the media access control mechanism defined by the IEEE 802.11 (CSMA/CA) or increase the carrier sense threshold to transmit a burst of empty data frames with a multicast/broadcast destination address and adapting the inter-frame space to the most suitable one in each case.

Use of transmission opportunities (TXOP) during which empty multicast/broadcast data frames are transmitted with reduced inter-frame space (RIFS) of 2 µs, as defined by IEEE 802.11.

The listed mechanisms proposed enable the generation of a low frequency carrier signal below 40 kHz, which we have successfully used to trigger the operation of a wake-up receiver based on the chip AS3933 (Austria Microsystems) and LR data communication with the same device.

The second challenge derives from the carrier sense multiple access (CSMA) scheme used by the media access control (MAC) defined in IEEE 802.11 and IEEE 802.15. A low rate data transmission based on IEEE 802.11 or IEEE 802.15 (a Wake-up signal, for example) is interrupted when the LR transmitter 1 detects the presence of other transmissions on the same frequency channel. First, low rate transmissions generated by means of IEEE 802.11 or IEEE 802.15 frame bursts may require long silence periods (for example, a binary '0' with OOK modulation is represented by a silence period of duration $T_b$, as represented in signal 21 of FIG. 3). Second, it is a known fact that ISM bands are often heavily loaded with other IEEE 802.11 or IEEE 802.15 transmissions. Consequently, the system may receive a large number of interfering signals, which can interrupt the transmission of LR frames 15 frequently. The simplest approach to overcome this problem is the use of wired connections between transmitter and receiver but the convenience of wireless transmissions can be retained as follows.

To reduce the harmful impact of external Wi-Fi frame transmissions, an alternative use of a mechanism provided by the same IEEE 802.11 is proposed. IEEE 802.11 frames include a MAC header field named Duration/ID to indicate the period during which the channel will be in use due to the transmission of the current IEEE 802.11 frame. Consequently, IEEE 802.11 stations decoding that field will defer their pending transmissions during the time specified in this header field, thus avoiding potential collisions. If the IEEE 802.11 frames of the frame burst 22 generated by the LR transmitter 1 are sent with the Duration/ID field set to the maximum possible value, potential interference from other IEEE 802.11 stations is minimized during the transmission of a LR frame 15.

The different stages in the design of the LR receiver 8 (FIG. 1) correspond to a conventional architecture for Wake-up receivers. Typically, those receivers include a demodulation stage 11 where, by means of envelope detection, a low rate signal is extracted from a high frequency carrier. The low rate signal feeds the comparator 12, which recovers the binary data 14. The present invention requires an additional stage to this typical configuration: the envelope detector 10. Some commercial circuits, such as AS3933, implement efficient envelope detectors for carrier signals in the range of several kHz. In order to use those circuits to detect transmissions in the range of GHz from a LR transmitter 1 built upon an IEEE 802.11 or IEEE 802.15 interface 7, an additional envelope detector is required (first conversion from GHz to kHz). An appropriate antenna design 9 is also required to receive signals in the 0.9, 2.4 and 5 GHz ISM bands optimally. According to this design, the output of the envelope detector 10 is an OOK-modulated signal 21, as shown in FIG. 3. When the LR frame 15 includes a receiver ID 17 (see FIG. 2), the address correlator 13 of the LR receiver 8 compares the content of the receiver ID field with the receiver's own ID. This correlation process requires a very small amount of energy (current consumption in the range of µA) and, hence, the LR receiver 8 will not waste a significant amount of energy by processing LR frames 15 not intended for it.

Applications

Figure 4:
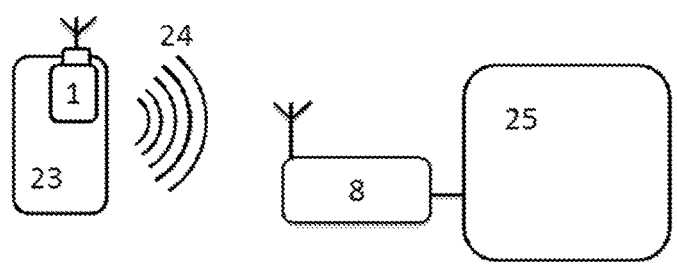
FIG. 4: Example of application.

Regarding to the generation of low frequency signals in IEEE 802.11 transmissions, two types of applications are contemplated, as shown in FIG. 4: low rate communications with feature-limited devices, such as sensors or actuators, and Wake-up Radio systems (WuR).

The proposed mechanism enables the wireless transmission 24 of information towards electronic appliances 25, which do not support the complexity and demand of energy that an IEEE 802.11 compatible receiver would require; technology, on the other hand, which can be found in a huge variety of current consumer electronic devices. Therefore, the proposed method enables the user to interact with different types of electronic appliances or devices 25 such as sensors, actuators, switches, etc. by means of any off-the-shelf Wi-Fi device 23 implementing a LR transmitter 1 (e.g. a phone, laptop, tablet, etc.) thanks to the use of a LR receiver 8.

A second application of this method consists in the possibility to wake up a very low-consumption LR receiver 8 which will, in turn, activate a larger appliance; in this case, this module is called Wake-up receiver. This kind of wireless receivers are connected to an appliance 25, the energy consumption of which is intended to be reduced. Thanks to the LR receiver 8, the electronic appliance 25 can be switched to a "sleeping" state, or low consumption state, while its use is not required. By means of a wireless transmission 24, generated through the proposed mechanism, it is possible to activate the LR receiver 8 so that it wakes up the associated electronic appliance 25. This way of operation allows several orders of magnitudes reduction in energy consumption. For a system based on IEEE 802.11, any off-the-shelf Wi-Fi device 23 with a LR transmitter 1 will be able to generate the wireless transmission 24 that is used as the Wake-up signal. This signal will wake up the intended electronic appliance 25, which has a LR receiver 8 operating as a WuR tuned in the 0.9, 2.4 or 5 GHz ISM bands.

In the case that this system is applied to a group of Wi-Fi Access Points (APs) operating as electronic appliances 25, for the purpose of saving energy and reducing interferences, the APs that are not in use will remain in a state of energy saving until the LR receiver 8, operating as a WuR circuit, wakes up the required AP. From then on, the transmission between the off-the-shelf Wi-Fi device 23 and such AP will follow the procedures defined by the IEEE 802.11 standard, bypassing the LR receiver 8.

NUMERICAL REFERENCES

1 LR Transmitter
2 Formatter
3 User binary data
4 Receiver(s) identifier(s)
5 Encoder
6 Driver
7 Wireless network interface card
8 LR Receiver
9 Receiver's antenna
10 Envelope detector
11 Demodulation stage
12 Comparator
13 Address Correlator
14 Binary data extracted from 18
15 LR frame
16 Preamble
17 Receiver ID, obtained from 4
18 Binary data obtained from 3
19 LR binary data
20 Coded data
21 OOK modulated signal
22 Frame burst
23 Off-the-shelf Wi-Fi device
24 Wireless transmission
25 Electronic appliance

What is claimed is:

1. A method of transmitting information, the method comprising:
   receiving, by a transceiver with a transmitter and a receiver, binary data to be transmitted to one or more receivers and one or more identifiers of the one or more receivers, said transmitter being a high-rate transmitter compliant with the IEEE 802.11 communication standard and said one or more receivers capable of detecting said binary data generated from IEEE 802.11 frames;
   encapsulating, by the transmitter, the one or more identifiers of the one or more receivers in a first field of a low rate (LR) frame and binary data, to be transmitted to one or more receivers, in a second field of the LR frame, wherein the LR frame is used to encapsulate said binary data and said identifiers at a rate slower than the data rate of the IEEE 802.11 frame transmission, and the LR frame is composed of sequential transmission of high rate IEEE 802.11 frames;
   encoding, by the transmitter, the LR frame based on a line encoding method to generate a waveform that includes a pattern alternating between a first value (ON) and a second value (OFF); and
   transmitting, by the transmitter, a signal corresponding to an On-Off Keying (OOK)-modulated signal,
   wherein the first value (ON) of the transmitted signal includes two frequency components, having a first frequency component lower than a second frequency component, and the second value (OFF) of the transmitted signal contains no transmissions;
   wherein the second frequency component is used to generate the first value (ON) of the transmitted signal with the transmission of a certain number of successive null data packets (NDP), control, data or management frames defined in the IEEE 802.11 standard, that are all of a same type, have a certain duration, and are separated by regular time intervals; and
   wherein said certain number, type, duration and time separation of the successive NDP, control, data or management frames defined in the IEEE 802.11 standard are chosen to determine the first frequency component.

2. The method of claim 1, wherein the plurality of standard-compliant IEEE 802.11 frames includes a smallest frame defined in the standard followed by a shortest interframe spacing allowed by the standard.

3. The method of claim 1, wherein the plurality of standard-compliant IEEE 802.11 frames include a plurality of successive null data packet (NDP) frames.

4. The method of claim 1, wherein the plurality of standard-compliant IEEE 802.11 frames includes a plurality of successive control frames of an acknowledgment (ACK) type.

5. The method of claim 1, wherein the plurality of standard-compliant IEEE 802.11 frames includes a plurality of successive control frames of a request to send (RTS) type.

6. The method of claim 1, wherein the plurality of standard-compliant IEEE 802.11 frames includes a plurality of successive control frames of a clear to send (CTS) type.

7. The method of claim 1, wherein the plurality of standard-compliant IEEE 802.11 frames includes a plurality of successive management frames of a beacon type.

8. The method of claim 1, wherein the plurality of standard-compliant IEEE 802.11 frames includes a plurality of empty data frames having a destination address of one of a broadcast type and a multicast type.

9. The method of claim 1, wherein each of the plurality of standard-compliant IEEE 802.11 frames includes one of a Legacy Signal (L-SIG) field and a duration field having a value equal to or greater than a time associated with the plurality of standard-compliant IEEE 802.11 frames or a value that is set to a highest value possible in accordance with IEEE 802.11 standards.

10. The method of claim 1, further comprising:
    encapsulating, in a third field of the LR frame, second data different from the one or more identifiers of the one or more receivers and different from the binary data.

11. The method of claim 10, wherein the second data comprises one of: a length of data, a type of message, and a version of a protocol.

12. A device, comprising a high-rate transmitter compliant with an IEEE 802.11 communication standard, the transmitter including:
    a formatter module adapted to:
      receive binary data to be transmitted to one or more receivers and one or more identifiers of the one or more receivers, said transmitter being a high-rate transmitter compliant with the IEEE 802.11 communication standard and the one or more receivers being capable of detecting said binary data generated from IEEE 802.11 frames; and
      encapsulate the one or more identifiers of the one or more receivers in a first field of a low rate (LR) frame and binary data, to be transmitted to one or more receivers, in a second field of the LR frame, wherein the LR frame is used to encapsulate said binary data and said identifiers at a rate slower than the data rate of the IEEE 802.11 frame transmission, and the LR frame is composed of sequential transmission of high rate IEEE 802.11 frames;

an encoder module adapted to encode the LR frame based on a line encoding method to generate a waveform that includes a pattern alternating between a first value (ON) and a second value (OFF); and a wireless interface adapted to transmit a signal corresponding to an On-Off Keying (OOK)-modulated signal, wherein the first value (ON) of the transmitted signal includes two frequency components, having a first frequency component lower than a second frequency component, and the second value (OFF) of the transmitted signal contains no transmissions;

wherein the second frequency component is used to generate the first value (ON) of the transmitted signal with the transmission of a certain number of successive null data packets (NDP), control, data or management frames defined in the IEEE 802.11 standard, that are all of a same type, have a certain duration, and are separated by regular time intervals; and wherein said certain number, type, duration and time separation of the successive NDP, control, data or management frames defined in the IEEE 802.11 standard are chosen to determine the first frequency component.

* * * * *